United States Patent [19]

Ohmura et al.

[11] Patent Number: 4,674,788
[45] Date of Patent: Jun. 23, 1987

[54] VEHICULAR AIR FLOW CONTROL DEVICE WITH VARIABLE ANGLE AIR FLOW CONTROL FIN

[75] Inventors: Yutaka Ohmura, Fujisawa; Ryouji Shimura, Yokohama, both of Japan

[73] Assignees: Nissan Motor Company, Limited; Ohi Seisakusho Company, Limited, both of Kanagawa, Japan

[21] Appl. No.: 706,112

[22] Filed: Feb. 27, 1985

[30] Foreign Application Priority Data

Feb. 29, 1984 [JP] Japan .................................. 59-39375
Jul. 18, 1984 [JP] Japan ................................ 59-149170
Oct. 4, 1984 [JP] Japan ................................ 59-208862

[51] Int. Cl.$^4$ ............................................. B62D 37/02
[52] U.S. Cl. ..................................... 296/1 S; 296/91
[58] Field of Search ................................... 296/91, 1 S

[56] References Cited

U.S. PATENT DOCUMENTS 3,647,257  3/1972  Litchfield ............................. 296/91
4,174,863  11/1979  Götz .................................... 296/1 S
4,179,154  12/1979  Ingram ................................ 296/91
4,256,339  3/1981  Ingram ................................ 296/1 S

FOREIGN PATENT DOCUMENTS 0005358  11/1979  European Pat. Off. .
0110232  6/1984  European Pat. Off. .
2614010  10/1977  Fed. Rep. of Germany ........ 296/91

Primary Examiner—Robert R. Song
Attorney, Agent, or Firm—Schwartz, Jeffery, Schwaab, Mack, Blumenthal & Evans

[57] ABSTRACT

An air flow control device for an automotive vehicle includes an air flow control fin pivotably secured near the rear end of a vehicle. The air flow control fin is pivotable to either of two angular positions with respect to the vehicle body. A manual operator is disposed within a vehicle compartment and is connected to the air flow control fin through a remote control mechanism. The air flow control fin is movable between a first spoiler position in which the fin diverts air flowing along vehicle body surface upwards so as to exert a downward force and enhance the traction of the vehicular wheels, and a second air flow guide position in which the fin guides the air flow toward a rear window surface so as to remove rain water, dust and so forth. The manual operator can be operated by a driver in the vehicle compartment to select either the first spoiler position or the second air flow guide position.

24 Claims, 16 Drawing Figures

VEHICULAR AIR FLOW CONTROL DEVICE WITH VARIABLE ANGLE AIR FLOW CONTROL FIN

BACKGROUND OF THE INVENTION

The present invention relates generally to an air flow control device for a vehicle, especially for an automotive vehicle. More specifically, the invention relates to a vehicular air flow control system which has an air flow control fin with a variable inclination.

It is well known that a rear spoiler fin can effectively divert air flowing along the vehicular body, which would otherwise generate lift, so as to generate a downward force to enhance the traction of the vehicular wheels. It is also well known from the disclosure of the Japanses Utility Model First Publication (Jikkai) Showa 48-13939, that an air flow guide or control fin guiding air flow along a rear window surface can effectively wipe the outside surface of a window free of rain water, dust and so forth by the effect of the diverted air flow.

However, the latter mentioned air flow guide fin may adversely affect the aerodynamics of the vehicle and generate upward lift, especially when the vehicle speed is relatively high. Therefore, this air flow guide fin is considered effective only when the vehicle is travelling at relatively low speeds in which case, significant body lift will not occur. On the other hand, while the vehicle speed is relatively low, the rear spoiler will not have any significant aerodynamical effects, since the downward force exerted on the vehicle body through the spoiler fin will be relatively weak.

Thus, it has been observed that an air flow guide which can guide air flow along the rear window external surface while the vehicle is moving at a relatively low speed and which is also able to serve as a rear spoiler when the vehicle speed is relatively high, would be useful both for clearing the rear window and for enhancing the aerodynamics of the vehicle.

It would be even more convenient if the air flow control or guide fin inclination could be adjusted depending upon the vehicle driving conditions or under the control of the driver, especially if, the driver could control the inclination of the air flow control fin from inside the vehicle compartment or cab.

SUMMARY OF THE INVENTION

Therefore, it is an object of the present invention to provide a air flow control device for a vehicle, especially for an automotive vehicle, which includes a fin member with a variable inclination with respect to the vehicle body.

Another object of the invention is to provide an air flow control device with a variable inclination which can be remote controlled from inside the vehicle compartment.

A further object of the invention is to provide an air flow control device for an automotive vehicle which can effectively sweep rain water, dust or so forth off the outer surface of a vehicle window and which can exert a downward force on the vehicle.

In order to accomplish the aforementioned and other objects, an air flow control device for an automotive vehicle, according to the invention, includes an air flow control fin pivotably secured near the rear end of a vehicle. The air flow control fin is pivotable so as to allow adjustment of its inclination with respect to the vehicle body. A manual operator is disposed within a vehicle compartment and is connected to the air flow control fin through a remote control mechanism. The air flow control fin is movable between a first spoiler position in which the fin diverts air flowing along vehicle body surface upwards, thus exerting a downward force to enhance the traction of the vehicular wheels, and a second air flow guide position in which the fin guides the air flow downwards along a rear window surface in order to sweep away rain water, dust and so forth. The manual operator can be operated by a driver in the vehicle compartment to move the fin between the first spoiler position and the second air flow guide position.

In accordance one aspect of the invention, an air flow control fin for a vehicle comprises a fin, and mounting means for pivotably mounting the fin on the vehicle adjacent the rear window, the mounting means allowing pivotal movement of the fin between a first position in which the fin diverts air flowing along the vehicle body upwards to reduce aerodynamic lift, and a second position in which the fin guides air flow toward the rear window for blowing rain water, dust and the like off the rear window.

According to another aspect of the invention, an air flow control device comprises a fin, mounting means for pivotably mounting the fin on a portion of the roof of the vehicle adjacent the rear window, the mounting means allowing pivotal movement of the fin between a first position in which the fin splits air flowing along the vehicle body to reduce drafting force, and a second position in which the fin guides air flow toward the rear window for sweeping rain water, dust and other attachings on the rear window, and actuator means associated with the mounting means for actuating the fin between the first and second positions.

BRIEF DESCRIPTION OF THE DRAWINGS

The present invention will be understood more fully from the detailed description given herebelow and from the accompanying drawings of the preferred embodiments of the invention, which, however, should not be taken to limit the invention to the specific embodiments but are for explanation and understanding only.

In the drawings.

DESCRIPTION OF THE PREFERRED EMBODIMENT

Figure 1:
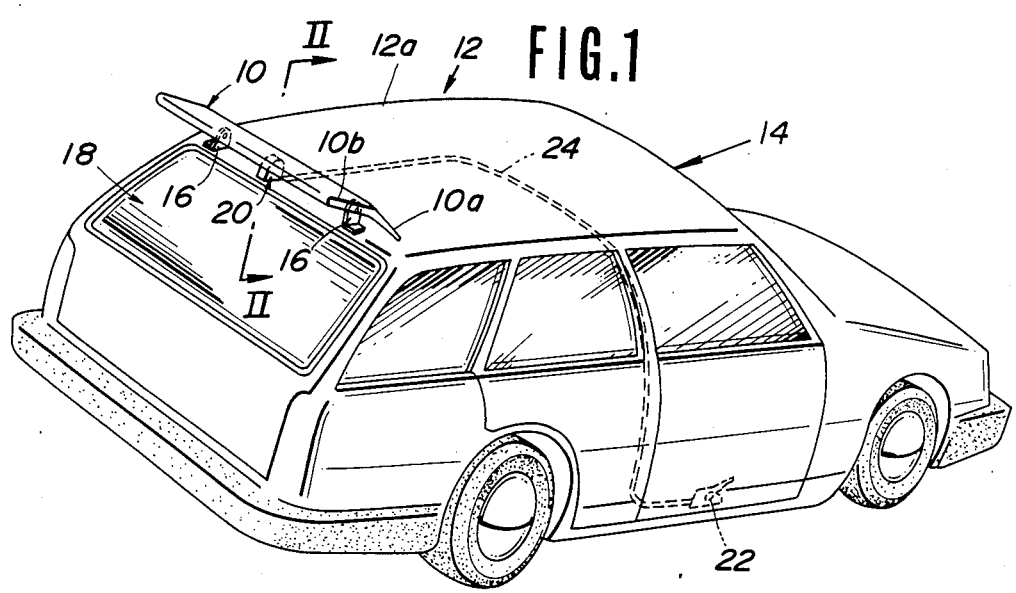
FIG. 1 is a fragmentary perspective view of an automotive vehicle to which the first embodiment of an air flow control device according to the present invention is applied.
Figure 2:
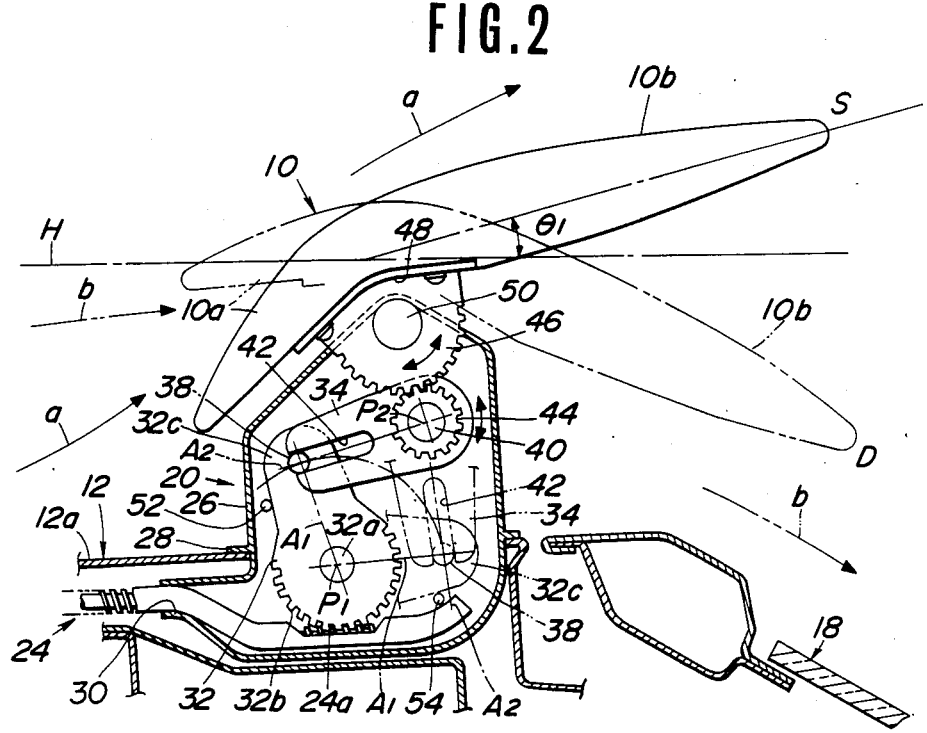
FIG. 2 is a cross-section taken along line II—II of FIG. 1, showing details of a major part of the first embodiment of the air flow control device of FIG. 1.
Figure 3:
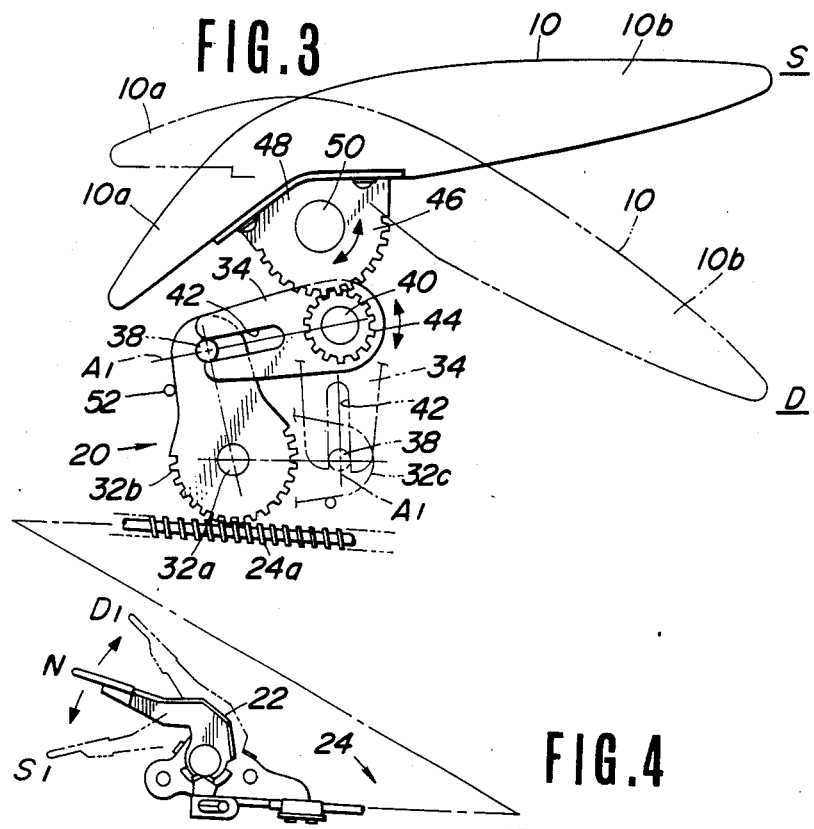
FIG. 3 is a diagram showing the operation of a remote control mechanism employed in the first embodiment of the air flow control device of FIG. 1.

Referring now to the drawings, particularly to FIGS. 1 to 3, the first embodiment of an air flow control device according to the present invention, includes an air flow control fin 10 mounted near the rear end of a vehicle roof 12 of a vehicle body 14. The air flow control fin 10 has a front section 10a and a rear section 10b, which sections are integrally formed and mutually oblique to form an essentially V-shaped configuration. The front section 10a tapers down to a rounded front end. Neglecting the angle formed by the two sections 10a, 10b the fin has an airfoil-like cross-section. The air flow control fin is pivotably secured to the vehicle roof 12 in the area where the front and rear sections 10a and 10b meet by a pair of hinge brackets 16 near its opposite ends. A fin angle adjusting mechanism, which is generally referred to by the reference number 20 and constitutes a part of a remote control mechanism for the air flow control fin 10, is disposed between the hinge brackets 16. The fin angle adjusting mechanism 20 cooperates with the air flow control fin 10 to adjust the angular position of the latter with respect to the vehicular roof surface. In the shown embodiment, the air flow control fin 10 can be tilted between a first spoiler position, in which the rear end of the fin is raised above the surface of the vehicle roof and away from a rear window 18, and a second air flow guide position, in which the rear section 10b of the air flow control fin 10 lies essentially parallel to the rear window surface so as to sweep rain water, dust and so forth off the outer window surface by means of the diverted air flow.

The fin angle adjusting mechanism 20 is also associated with a manual operation handle 22 located within a vehicle compartment near the driver's seat (not shown), through a linking wire 24. The linking wire 24 may be flexible wire, such as a Bowden cable, for cooperably connecting the fin angle adjusting mechanism 20 to the manual operation handle 22. The manual operation handle 22 is operable between a first position corresponding to the spoiler position of the air flow control fin 10 and a second position corresponding to the air flow guide position of the fin.

As shown in FIGS. 2 and 3, the fin angle adjusting mechanism 20 includes a casing 26 fixedly mounted on a roof panel 12a via a flange 28. The casing 26 defines a generally enclosed hollow space housing the fin angle adjusting mechanism. The casing 26 has a front end opening 30 through which the linking wire 24 passes. An inner wire 24a of the linking wire 24 has a worm-gear section with a given pitch.

The fin angle adjusting mechanism 20 includes a actuating force transmission arrangement including first and second links 32 and 34. The first link 32 is pivotably secured to the casing 26 through a rotatable shaft 32a which is rotatably mounted on the casing 26. The first link 32 is thus pivotable with the rotatable shaft 32a between a first position corresponding to the spoiler position of the fin 10 and a second position corresponding to the air flow guide position of the fin. The first link 32 has a toothed lower section with gear teeth 32b of a given pitch matching the pitch of the worm-gear section. The gear teeth 32b engage the worm-gear section of the linking wire 24, allowing the shaft 32a to pivot between its first and second positions according to the position of the manual operation handle 22. A connector pin 38 projects perpendicularly from the opposite end 32c of the first link.

The second link 34 is secured to a rotatable shaft 40 which is rotatably mounted on the casing 26 for pivotal movement with the rotatable shaft. The second link 34 is pivotable between a first position corresponding to the spoiler position of the fin 10 and a second position corresponding to the air flow guide position of the fin. The second link 34 has an elongated slit 42 extending from its free end to near the rotatable shaft which engages the connector pin 38 of the first link 32. The engagement between the connector pin 38 and the slit 42 causes the first and second links to pivot together according to the position of the manual operation handle 22.

A pinion gear 44 is coaxially and fixedly mounted on a rotatable shaft 40 of the second link 34 for rotation therewith. The pinion gear 44 directly engages a sector gear 46, which is secured to the air flow control fin 10 by means of a mounting bracket 48. The sector gear 46 is pivotably mounted on the casing 26 through a swing axle 50 about which the sector gear with the fin 10 pivots between the spoiler position and the air flow guide position.

The longitudinal axis $A_1$ of the first link 32 passes through a pivot axis $P_1$ of the rotatable shaft 32a. The longitudinal axis $A_2$ of the second link 34 passes through a pivot axis $P_2$ of the rotatable shaft 40. The first and second links 32 and 34 are so arranged within the casing 26 that the longitudinal axes $A_1$ and $A_2$ are nearly perpendicular to each other in both the first and second positions. A pair of stoppers 52 and 54 are fixed to the walls of the casing 26. The stopper 52 restrain the first link 32 from moving past its first position. The stopper 54 restrains the first link 32 from moving past its second position.

Operation of the above-described first embodiment of the air flow control device according to the present invention will be disclosed below with reference mainly to FIGS. 2 and 3.

In FIGS. 2 and 3, the air flow control fin 10 is illustrated at the spoiler position (S) in solid line and at the air flow guide position (D) in phantom line. In the spoiler position (S), the air flow a along the outer surface of the roof is diverted from the body surface by the effect of the raised air flow control fin 10, which air flow would otherwise tend to inflict a strong lift on the vehicle body, and so degrade road-tire traction. Instead, the positive angle $\theta_1$ of the fin 10 with respect to the horizontal plane H creates a downward force due to the air flow over the fin 10. This enhances road-tire traction. On the other hand, when the fin 10 is in the air flow guide position, air flow b along the vehicle roof 12 is guided downwards along the rear window surface. This air flow along the outer surface of the rear window may help sweep rain water, dust or so forth off of the window surface.

The driver may select either the spoiler position or the air flow guide position as desired. In general, the spoiler position of the fin should be selected when the vehicle is moving at a relatively high speed. Conversely, the air flow guide position of the fin should be selected when the vehicle speed is not so high or when the vehicle is travelling in the rain.

The desired position is selected by operating the manual operation handle 22. As shown in FIG. 3, the manual operation handle 22 is normally in a neutral position (N). To select the spoiler position (S), the manual operation handle 22 is pushed downward to the position $S_1$. This causes movement of the inner wire 24a of the linking wire 24 to the left in FIG. 3. The first link 32 pivots counterclockwise until it abuts the stopper 52. As the first link 32 pivots, the second link 34 cooperating with the first link through the connector pin 38 and the elongated slit 42 pivots clockwise. According to the clockwise movement of the second link 34, the pinion gear 44 rotates clockwise. The clockwise rotation of the pinion gear 44 causes the sector gear 46 to rotate counterclockwise and so raise the air flow control fin 10 to the spoiler position.

On the other hand, in order to move the air flow control fin 10 to the air flow guide position, the manual operation handle 22 is pulled upward to the position $D_1$. This causes movement of the inner wire 24a of the linking wire 24 to the right in FIG. 3. The first link 32 pivots clockwise until it abuts the stopper 54. As the first link 32 pivots, the second link 34 cooperating with the first link via the connector pin 38 and the elongated slit 42 pivots counterclockwise. The counterclockwise movement of the second link 34 causes the pinion gear 44 to rotate counterclockwise. The counterclockwise rotation of the pinion gear 44 causes the sector gear 46 to rotate clockwise and so lower the air flow control fin 10 to the air flow guide position.

Figure 4:
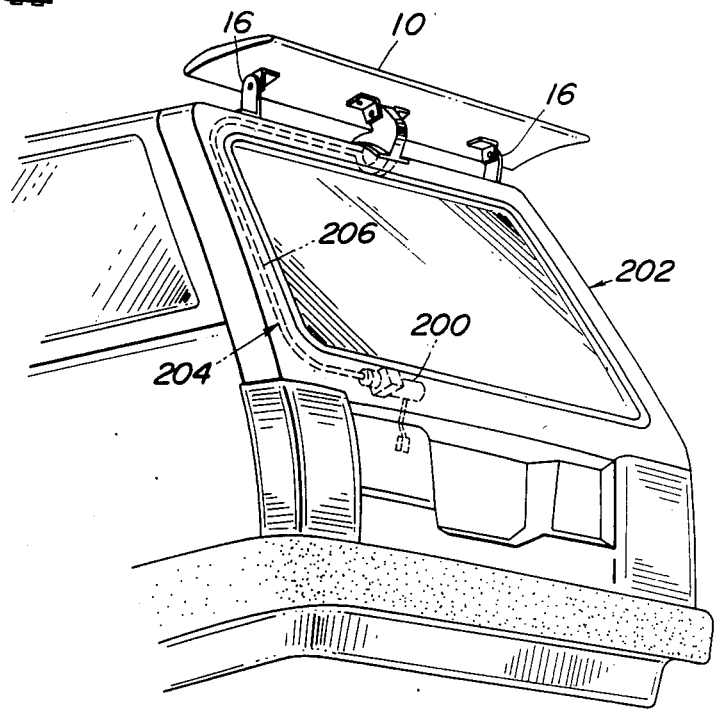
FIG. 4 is a perspective view of the rear end of an automotive vehicle to which the second embodiment of the air flow control device according to the present invention is applied.
Figure 5:
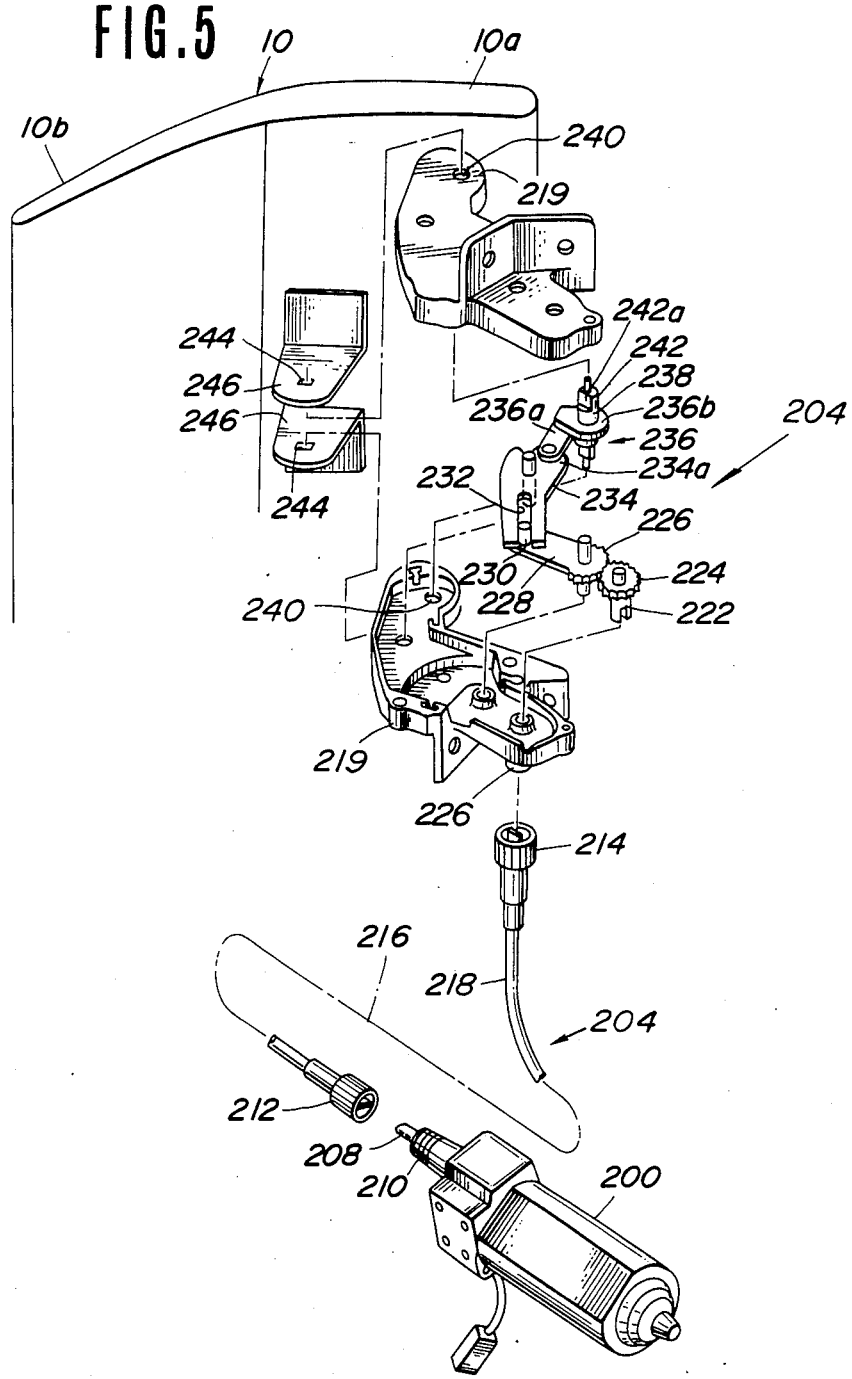
FIG. 5 is an exploded view of the second embodiment of air flow control device of FIG. 4.
Figure 6:
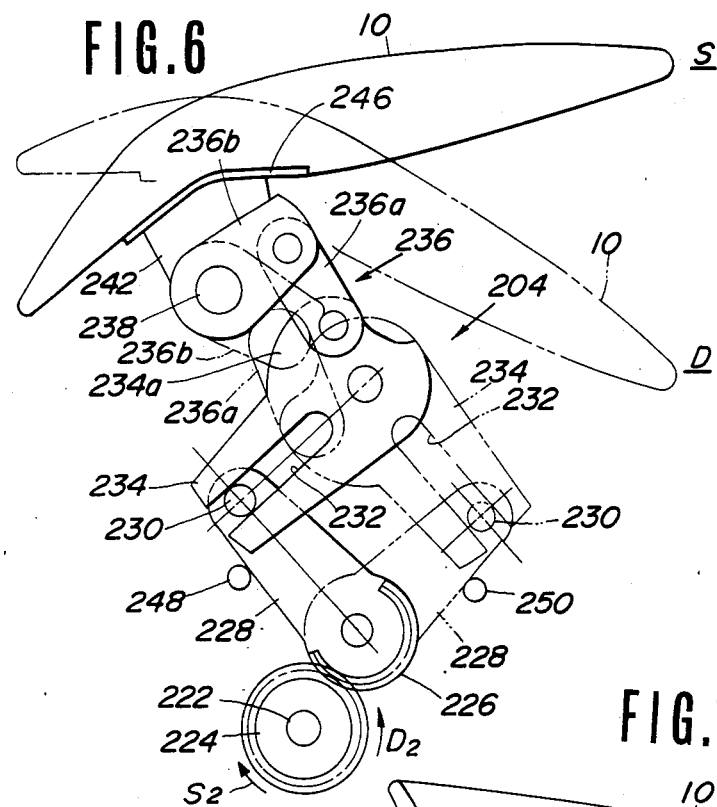
FIG. 6 is a diagram of the two positions of the major elements of a remote control mechanism of the first embodiment of the air flow control device.

FIGS. 4 to 6 show the second embodiment of an air flow control system for the automotive vehicle, according to the invention. In this embodiment, the remote control mechanism differs from that of the foregoing first embodiment. The remote control mechanism, in this embodiment, generally comprises a reversible motor 200 which is associated with an electric switch (not shown) installed near the driver's seat. The switch has a first switch position corresponding to the spoiler position of the air flow control fin 10 and a second switch position corresponding to the air flow guide position of the fin.

As shown in FIG. 4, the reversible motor 200 is mounted within a hatchback door 202 in the shown embodiment. Although the motor 200 has been illustrated as mounted within a hatchback door of a hatchback- or fastback-type vehicle, the motor may be installed at any appropriate place in the vehicle. The type of vehicle employing the air flow control system is not necessarily limited to the hatchback-type vehicle but may be a sedan, hardtop or the like lacking a hatchback door.

The reversible motor 200 is connected to a link mechanism which is generally referred to by the reference number 204 via a driving wire 206.

As shown in FIG. 5, the motor 200 has a driving shaft 208 and a projecting boss 210 coaxial with the driving shaft. The driving wire 206 has connecting sockets 212 and 214 at both ends. The socket 212 engages the projecting boss 210 of the motor 200 for connection to an inner wire 216 extending through an outer flexible tube 218 and constituting the driving wire 206. The other end of the driving wire 206 ends with the other socket 214 inserted into a casing 219 for the link mechanism 204. As shown in FIG. 5, the casing 219 comprises two separate symmetrical segments attached to each other to form the casing. The two segments are referred to by the same reference numeral 219.

The casing is formed with an opening 220 through which the socket 214 and the driving wire 206 enter the casing. The socket 214 engages a pinion shaft 222 of a driving pinion 224. With this arrangement, the driving pinion can be driven in first direction to move the fin 10 to the spoiler position and in second direction to move the fin to the air flow guide position, according to the motor driving direction. The driving pinion 224 meshes with gear teeth 226 formed on the lower edge of a first link 228. As will be appreciated from FIG. 5, the first link 228 has essentially the same design as in the first embodiment. The first link has a connector pin 230 engaging a slit 232 formed in a second link 234. The interaction of the first and second links 228 and 234 is essentially the same as in the first embodiment. The second link 234 are associated with a cam link 236. The cam link 236 is fixed to a rotary shaft 238 rotatably engaging openings 240 in the casing. Parts 242 of the rotary shaft 238 is rectangular in cross-section rather than cyclindrical. The rectangular sections 242 project out of the casing and engage rectangular openings 244 formed in a pair of mounting brackets 246 secured to the air flow control fin 10.

The cam link 236 comprises a first lever member 236a pivotably connected to a cam 234a of the second link 234, and a second lever member 236b from which the rotary shaft 238 extends.

The manual control switch in the vehicle compartment is operated by the driver to one of the first and second positions. According to the selected switch position, the reversible motor 200 is driven in a direction corresponding to the switch position. Rotational driving force of the reversible motor 200 is transmitted to the driving pinion 224 through the driving wire 206.

When the manual switch is turned to the first switch position, the driving pinion 224 is driven by the reversible motor 200 clockwise in FIG. 6, as represented by arrow $S_2$. The reversible motor 200 drives the driving pinion 224 until further counterclockwise pivotal movement of the first link 228 is prevented by a stopper 248. Counterclockwise rotation of the first link 228 causes the second link 234 to rotate clockwise while maintaining the engagement between the connector pin 230 and the slit 232. Clockwise rotation of the second link 234 causes the cam 234a to move to a position corresponding to the spoiler position of the air flow control fin 10. In this case, the first and second levers 236a and 236b of the cam link 236 are positioned as illustrated in solid line in FIG. 6. Raising the free end of the second lever member 236b causes the air flow control fin 10 to move to the spoiler position.

Conversely, when the manual switch is turned to the second switch position, the driving pinion 224 is driven counterclockwise by the reversible motor 200, as shown by arrow D₂ in FIG. 6. The reversible motor 200 drives the driving pinion 224 until further clockwise pivotal movement of the first link 228 is prevented by a stopper 250. Clockwise rotation of the first link 228 causes the second link 234 to rotate counterclockwise while maintaining the engagement between the connector pin 230 and the slit 232. Counter clockwise rotation of the second link 234 causes the cam 234a to move to a position corresponding to the air flow guide position of the air flow control fin 10. In this case, the first and second levers 236a and 236b of the cam link 236 are positioned as illustrated in phantom line in FIG. 6. Lowering the free end of the second lever member 236b causes the air flow control fin 10 to move to the air flow guide position.

Figure 7:
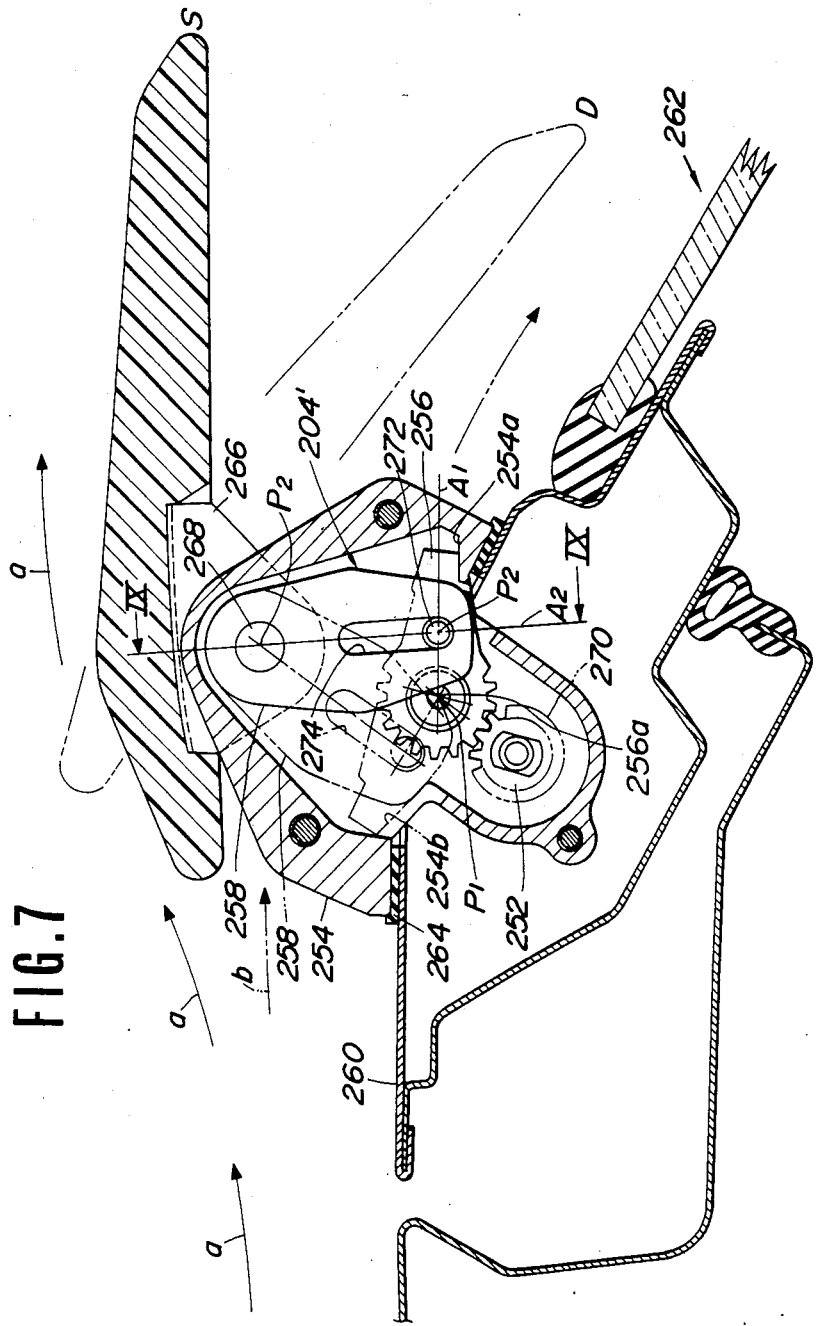
FIG. 7 is a cross-section of the second embodiment of the air flow control device according to the present invention.
Figure 8:
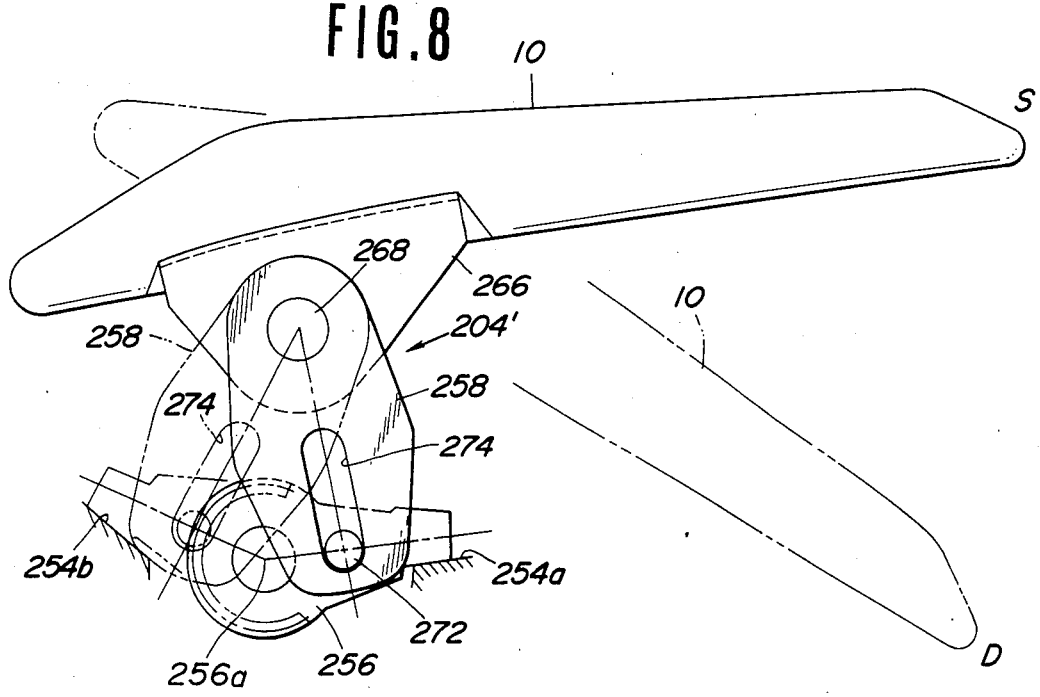
FIG. 8 is a diagram of the operation of the second embodiment of the air flow control device.
Figure 9:
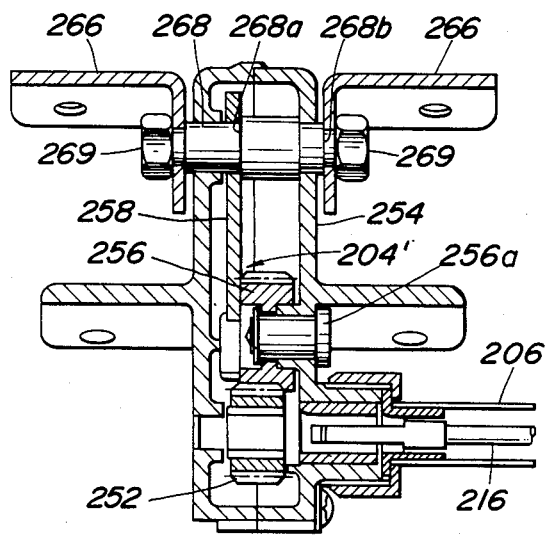
FIG. 9 is a section taken along line IX—IX of FIG. 7.
Figure 10:
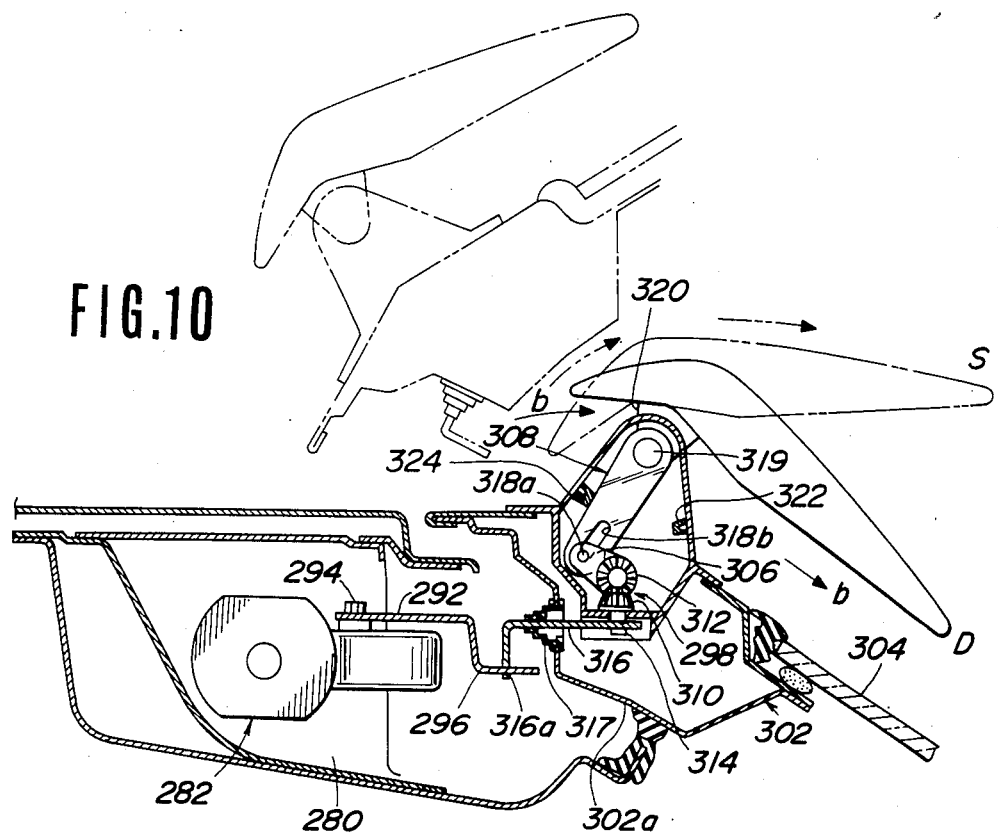
FIG. 10 is a longitudinal-section of the fourth embodiment of the air flow control system according to the present invention.

FIGS. 7 to 9 show the third embodiment of the air flow control device in accordance with the present invention. In this embodiment, the link mechanism 204 of the second embodiment is somewhat modified. Similarly to the foregoing second embodiment, this third embodiment employs a reversible motor (not shown) electrically controlled by the manual switch installed within the vehicle compartment. A driving pinion 252 is thus driven in essentially the same manner as set out with respect to the second embodiment.

The link mechanism 204' according to the third embodiment also includes a casing 254 housing first and second links 256 and 258 and the driving pinion 252. The casing 254 is secured to a reardoor frame 260 of a hatchback door 262 via a rubber grommet 264. A mounting bracket 266 fixed to air flow control fin 10 is rotatably supported by the casing 254 via a pivotal shaft 268 fixed to the bracket and rotatably secured to the casing. The second link 258 is also secured fixedly to the pivotal shaft 268 for rotation with the air flow control fin 10.

The driving pinion 252 meshes with gear teeth 270 formed on the first link 256 for driving the latter between the first position corresponding to the spoiler position of the fin 10 and the second position corresponding to the air flow guide position of the fin. The first link 256 has a connector pin 272 projecting perpendicularly from one of its surfaces. The connector pin 272 engages an elongated slot 274 formed in the second link 258.

As in the first embodiment, the longitudinal axis A₁ of the first link 256 extends through a pivot axis P₁ of the rotatable shaft 256a. The longitudinal axis A₂ of the second link 258 extends through a pivot axis P₂ of the pivotal shaft 268a. The first and second links 256 and 258 are so arranged in the casing 254 that the longitudial axes A₁ and A₂ are essentially perpendicular to each other at both the first and second positions thereof. Specially configured walls 254a and 254b of the casing 254 are designed to serve as stoppers defining the first and second positions of the first link.

As shown in FIG. 6, the pivotal shaft 268 has steps 268a and 268b. The second link 258 is fixed to the step 268a. On the othe hand, the bracket 266 is fixedly secured to the pivotal shaft 268 between the step 268b and fastening nuts 269. Also, as shown in FIG. 8, a pivot shaft 256a of the first link 256 is rotatably supported in the casing in cantilever fashion and falls within the area swept by the second link 258.

In operation, when the manual switch is turned to the first switch position, the driving pinion 252 is driven counterclockwise by the reversible motor. The reversible motor drives the driving pinion 252 until further clockwise rotation of the first link 256 is prevented by the wall 254a of the casing 254. Clockwise rotation of the first link 256 causes the second link 258 to rotate counterclockwise while maintaining the engagement between the connector pin 272 and the slot 274. The bracket 266 rotates counterclockwise with the second link 258 and so raises the rear end of the fin 10. As a result, the air flow control fin 10 is moved to the spoiler position.

On the hand, when the manual switch is turned to the second switch position, the driving pinion 252 is driven clockwise by the reversible motor. The reversible motor drives the driving pinion 252 until further counterclockwise rotation of the first link 256 is prevented by the wall 254b of the casing. Counterclockwise rotation of the first link 256 causes the second link 258 to rotate clockwise while maintaining the engagement between the connector pin 272 and the slot 274. The bracket 266 rotates clockwise with the second link 258 to lower the rear end of the fin 10. As a result, the air flow control fin 10 is moved to the air flow guide position.

FIGS. 10 to 13 shows the fourth embodiment of the air flow control device according to the present invention. In this embodiment, the remote control mechanism is different from those of the foregoing embodiments.

Figure 11:
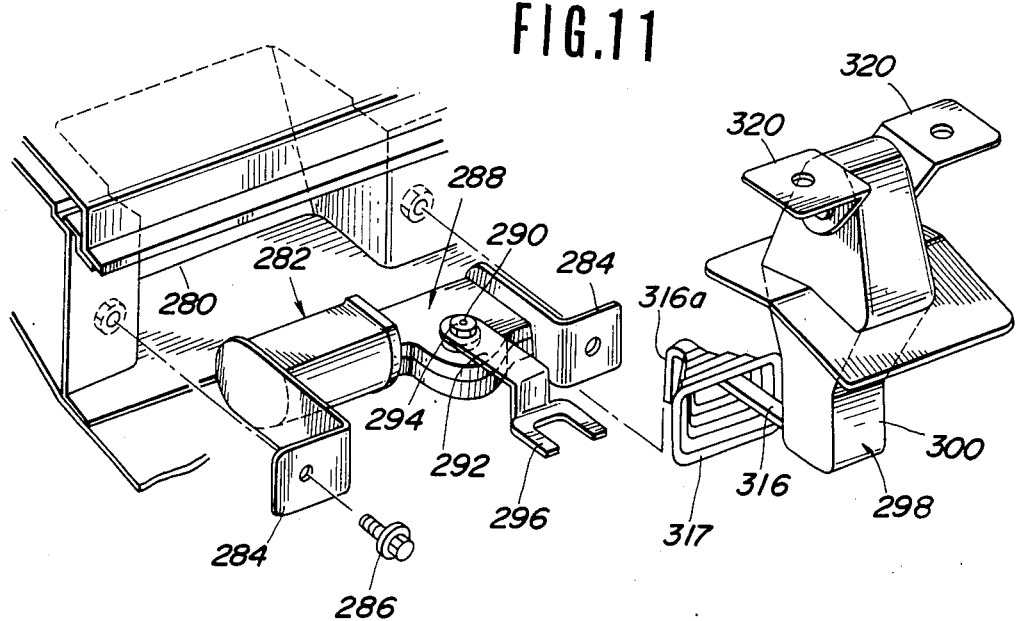
FIG. 11 is an enlarged, exploded perspective view of the major part of the third embodiment of the air flow control device.
Figure 12:
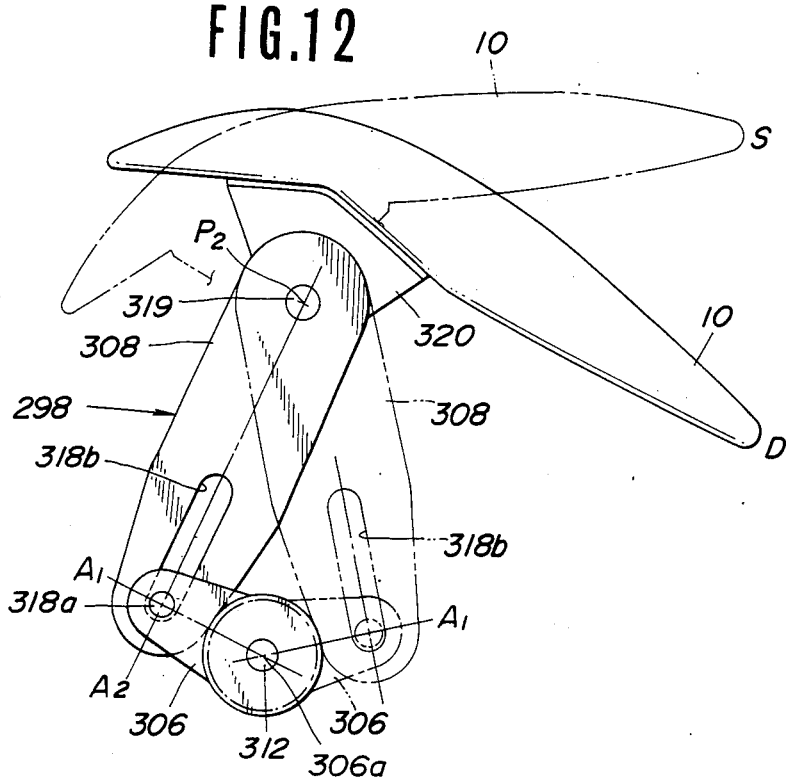
FIG. 12 is a diagram of the operating positions of the third embodiment of the air flow control device.
Figure 13:
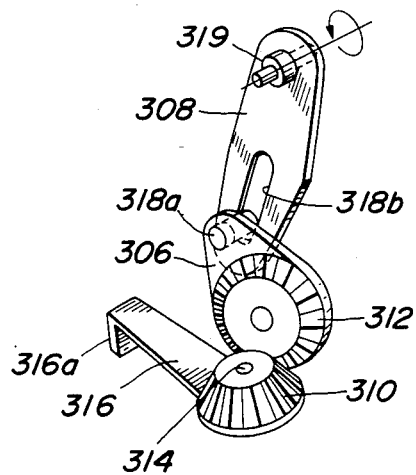
FIG. 13 is a perspective view of a major part of a remote control mechanism in the fourth embodiment of air flow control device.

A reversible motor housing 280 is defined in the rear end portion of the vehicular roof 12. A reversible motor 282 is housed in the housing 280. The reversible motor 282 is secured to the vehicle body panel 12a which may be a roof inner panel, by means of a pair of mounting brackets 284 and fastening bolts 286, as best shown in FIG. 11. The reversible motor 282 is associated with a reduction gear mechanism 288 with an output shaft 290. A driving lever 292 is secured to the output shaft 290 of the reduction gear mechanism 288 by means of a fastening nut 294. The driving lever 292 is crank-shaped as view horizontally and its free end 296 is bifurcated and will be referred to hereafter as "fork end". As in the foregoing embodiments, a link mechanism 298 is housed in a casing 300 which is mounted on a upper frame 302 of a rear gate door 304 hinged to a rear gate opening of a vehicle body.

The link mechanism 298 generally comprises a first link 306 and a second link 308. The first link 306 incorporates a bevel gear 310. The bevel gear 310 meshes with a bevel gear 312 having a gear shaft 314 extending through an opening formed in the bottom of the casing 300. Outside of the casing, the gear shaft 314 of the bevel gear 312 engages an essentially L-shaped lever 316. The L-shaped lever 316 passes through the rear gate door inner panel 302a via a dust cover 317. The free end 316a of L-shaped lever 316 is bent downwards to engage the fork end 296 of the driving lever 292. The gear shaft 314 serves as a pivot for the L-shaped lever 316.

As in the previous embodiments, the first link 306 has a connector pin 318a projecting perpendicularly from one surface. The connector pin 318a engages a slot 318b in the second link 308. In turn, the second link 308 is secured to a rotary shaft 319 rotatably secured to the casing 300. A mounting bracket 320 of the air flow control fin 10 is also fixedly secured to the rotary shaft 319 as described with respect to the foregoing third embodiment. Thus, the air flow control fin 10 with the mounting bracket 320 rotationally moves according to rotation of the rotary shaft.

As in the previous embodiments, the longitudinal axis $A_1$ of the first link 306 passes through a pivot axis $P_1$ of a rotatable shaft 306a to which it is fixed. The longitudinal axis $P_2$ of the second link 308 passes through a pivot axis of a rotary shaft 319 to which it is fixed. The first and second links 306 and 308 are so arranged in the casing 300 that the longitudinal axes and $A_2$ lie essentially perpendicular to each other in both the first and second positions. A pair of elastic stoppers 322 and 324 are fixed to the walls of the casing 300. The stopper 322 prevents the second link 308 from moving past its first position corresponding to the spoiler position of the fin 10. The stopper 324 prevents the second link 308 from moving past its second position corresponding to the air flow guide position of the fin 10.

The reversible motor 282 drives the driving lever 292 via the reduction gear mechanism to a first position to actuate the fin 10 to the spoiler position and to a second position to actuate the fin to the air flow guide position. The driving lever 292 pivots within an essentially horizontal plane. As the bevel gear 312 is associated with the driving lever 292 through the L-shaped lever 316, it pivots according to the movement of the driving lever. For instance, when the driving lever 292 pivots counterclockwise as viewed in FIG. 11, the bevel gear 312 rotates clockwise, and when the driving lever 292 pivots clockwise, the bevel gear 312 pivots counterclockwise.

In the former case, the bevel gear 312 drives the first link 306 clockwise until further clockwise movement of the first link is prevented by the stopper 322 of the casing 300. Clockwise rotation of the first link 306 causes the second link 308 to rotate counterclockwise while maintaining the engagement between the connector pin 318a and the slot 318b. The bracket 320 rotates counterclockwise with the second link 308 to raise the rear end of the fin 10. As a result, the air flow control fin 10 is moved to the spoiler position.

Conversely, when the driving lever 292 pivots counterclockwise, the bevel gear 312 pivots clockwise. Clockwise rotation of the bevel gear 312 causes the first link 306 to rotate counterclockwise until further counterclockwise rotation of the first link 306 is prevented by the stopper 324 of the casing. Counterclockwise rotation of the first link 306 causes the second link 308 to rotate clockwise while maintaining the engagement between the connector pin 318a and the slot 318b. The bracket 320 rotates clockwise with the second link 308 to lower the rear end of the fin. As a result, the air flow control fin 10 is moved to the air flow guide position.

Figure 14:
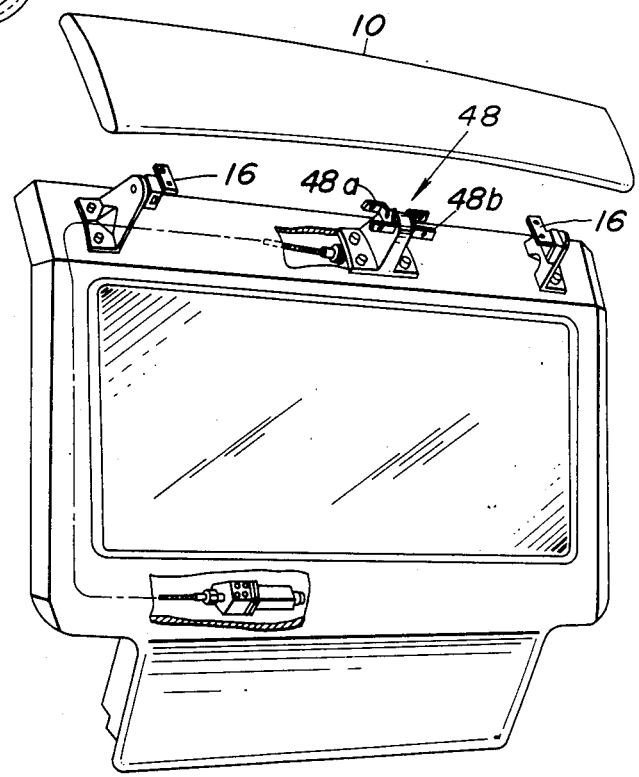
FIG. 14 is a perspective view of the rear end of a vehicle to which the fifth embodiment of the air flow control device according to the present invention is applied.
Figure 15:
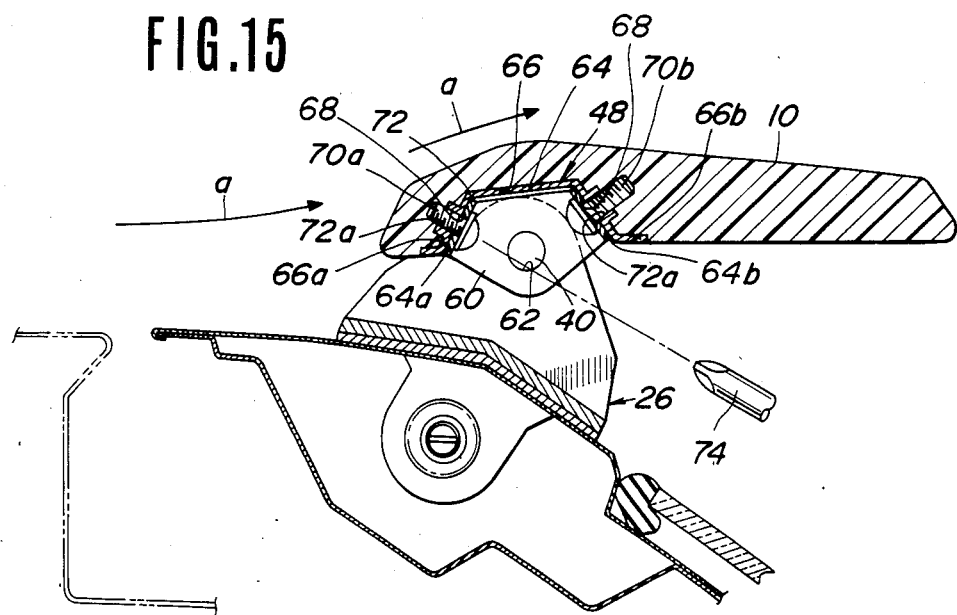
FIGS. 15 and 16 show how to secure an air flow control fin to the vehicle body.
Figure 16:
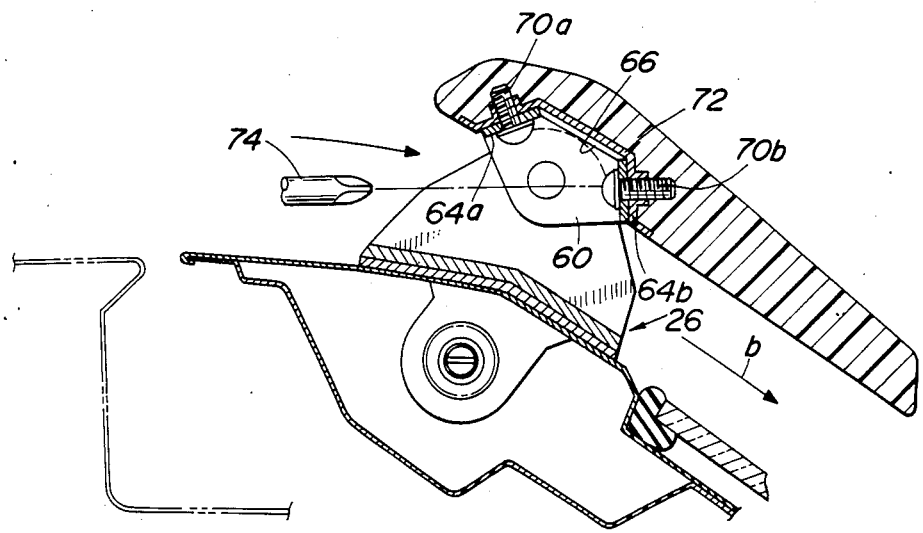

FIGS. 14 to 16 show how to mount the air flow control fin onto a mounting bracket, such as one of the brackets 48 of the first embodiment, 246 of the second embodiment, 266 in the third embodiment and 320 of the forth embodiment. For ease of disclosure, the bracket will be referred to by the reference numeral 48. The bracket 48 comprises a matched pair of segments 48a and 48b as shown in FIG. 14. The segments 48a and 48b are located on opposite sides of the casing 26 housing the link mechanism. The segments 48a and 48b are fixed to opposite ends of the rotatable shaft 40 for rotation therewith.

Each segment 48a and 48b of the mounting bracket 48 has a vertical section 60 with a circular hole 62 through which the rotatable shaft 40 extends, and a horizontal section 64 to be attached to the lower surface of the air flow control fin 10. As shown in FIGS. 15 and 16, the air flow control fin 10 is formed with a recess 66 designed to receive the horizontal section 64 of each segment 48a and 48b of the bracket. Front and rear side walls 66a and 66b of the recess 66 are oblique to the rest of the recess 66. The horizontal section 64 conforms to the shape of the recess and thus has bent front and rear ends 64a and 64b in contact with the front and rear walls 66a and 66b of the recess.

Each of the front and rear ends 64a and 64b is pierced by a circular hole 68, through which fastening screws 70a and 70b engage threaded openings 72a in a reinforcement 72 lining the recess.

The angle of the front and rear walls 66a, 66b and the front and rear ends 64a and 64b are selected so that, when the air flow control fin 10 is in the spoiler position as shown in FIG. 15, the fastening screw 70b for the rear end 64b cannot be reached by a screw-driver 74 due to the interference of the vehicle body. On the other hand, as shown in FIG. 16, when the air flow control fin 10 is in the air flow guide position, the front fastening screw 70a engaging the front end 64a is prevented from being loosened by a screw-driver 74 due to the interference of the vehicle body.

As a result, unless the air flow control fin 10 is moved to both the spoiler position and the air flow guide position, the air flow control fin can not be released from the bracket. This successfully prevents the fin from being stolen.

As set forth above, the invention fulfills all of the objects and advantages sought therefor.

While the present invention has been disclosed in terms of the preferred embodiments of the invention, the invention may be embodied in various way other than those disclosed and the preferred embodiments set out above may be modified in many ways without departing from the principle of the invention. Therefore, it should be appreciated that the invention should include all of the possible embodiments and modifications derived from the principle set out in the appended claims.

What is claimed is:

1. An air flow control fin for a vehicle having a rear window, comprising:

a fin having a first section and a second section connected to said first section in oblique fashion, said first section having a first surface and said second section having a second surface said fin being mounted on a roof of the vehicle adjacent said rear window and pivotable between a first position in which said first surface splits air flowing along the roof, and a second position in which said second surface directs said air flowing along the roof to flow along said rear windows; and mounting means secured to said fin adjacent said oblique connection for pivotally mounting said fin on said roof adjacent said rear window, said mounting means allowing pivotable movement of said fin between said first position and said second position, said mounting means including means for holding said fin in a selected one of said first and second positions, said holding means including a lever pivotable about a pivot axis and having a projection engaged with a slot in a member operatively engaging said fin, said lever being arranged to receive a force exerted on said fin and to alter the direction of said force toward said pivot axis to establish a holding force for holding said fin at said selection position;

wherein said first position directs said first surface toward said air flowing along said roof and directs the air upward, and wherein said second position directs said second surface to said air flow and guides said air flow towards said rear window.

2. The air flow control fin as set forth in claim 1, which further comprises actuator means associated with said mounting means for actuating said fin between said first and second positions.

3. The air flow control fin as set forth in claim 2, wherein said mounting means includes means for holding said fin in the selected one of said first and second positions.

4. The air flow control fin as set forth in claim 3, wherein said actuator means includes a manual operator disposed with a vehicle compartment for enabling actuation of said fin between said first and second positions from inside the vehicle compartment.

5. The air flow control fin as set forth in claim 4, wherein said actuator means further comprises means for transmitting force applied to said manual operator to said mounting means for actuating said fin between said first and second positions.

6. The air flow control fin as set forth in claim 5, wherein said force transmission means includes a link mechanism.

7. An air flow control fin for a vehicle having a rear window, comprising:

a fin having a first section and a second section connected to said first section in oblique fashion, said first section having a first surface and said second section having a second surface, said fin being mounted on a roof of the vehicle adjacent said rear window and pivotable between a first position in which said first surface splits air flowing along the roof, and a second position in which said second surface directs said air flowing along the roof to flow along said rear window and which further comprises actuator means associated with said mounting means for actuating said fin between said first and second positions, said actuator means including a manual operator disposed within a vehicle compartment for enabling actuation of said fin between said first and second positions from inside the vehicle compartment and means for transmitting force applied to said manual operator to said mounting means for actuating said fin between said first and second positions, and a link mechanism, wherein said link mechanism comprises a first component associated with said mounting means for movement between first and second positions with said fin, and a second component releasably engaging said first component.

8. A air flow control fin as set forth in claim 7 designed for use on a vehicle with a hatchback door incorporating said rear window, which hatchback door is pivotable about a hinge provided on a rear gate opening of the vehicle body, wherein said first component and said mounting means are mounted on said hatchback door, and said second component of said link is mounted on said vehicle body near said rear gate opening.

9. The air flow control fin as set forth in claim 8, wherein said first and second components are engaged while said hatchback door is closed, and are disengaged while said hatchback door is open.

10. The air flow control fin as set forth in claim 4, wherein said actuator means includes a driving motor electrically operable in either a first or a second direction, said driving motor being electrically connected to said manual operator which comprises an electric switch actuable to either a first switch position corresponding to said first position of said fin or a second switch position corresponding to said second position of said fin.

11. The air flow control fin as set forth in claim 10, wherein said actuator means includes a link mechanism.

12. An air flow control fin for a vehicle having a rear window, comprising:

a fin having a first section and a second section connected to said first section in oblique fashion, said first section having a first surface and said second section having a second surface, said fin being mounted on a roof of the vehicle adjacent said rear window and pivotable between a first position in which said first surface splits air flowing along the roof, and a second position in which said second surface directs said air flowing along the roof to flow along said rear window and which further comprises actuator means associated with said mounting means for actuating said fin between said first and second positions, said actuator means including a manual operator disposed within a vehicle compartment for enabling actuation of said fin between said first and second positions from inside the vehicle compartment and said actuator means including a driving motor electrically operable in either a first or a second direction, said driving motor being electrically connected to said manual operator which comprises an electric switch actuable to either a first switch position corresponding to said first position of said fin or a second switch position corresponding to said second position of said fin and a link mechanism comprising a first component associated with said mounting means for movement between first and second positions with said fin, and a second component releasably engaging said first component; and mounting means secured to said fin adjacent said oblique connection pivotally mounting said fin on said roof adjacent said rear window, said mounting means allowing pivotable movement of said fin between said first position and said second position including means for holding said fin in the selected one of said first and second positions;

wherein said first position directs said first surface toward said air flowing along said roof and directs the air upward, and wherein said second position directs said second surface to said air flow and guides said air flow towards said rear window.

13. A air flow control fin as set forth in claim 12 designed for use on a vhicle with a hatchback door incorporating said rear window, which hatchback door is pivotable about a hinge provided on a rear gate opening of the vehicle body, wherein said first component and said mounting means are mounted on said hatchback door, and said second component of said link is mounted on said vehicle body near said rear gate opening.

14. The air flow control fin as set forth in claim 13, wherein said first and second components are engaged while said hatchback door is closed, and are disengaged while said hatchback door is open.

15. An air flow control fin for a vehicle having a rear window, comprising:
a fin;
mounting means for pivotably mounting said fin on said vehicle adjacent said rear window, said mounting means allowing pivotal movement of said fin between a first position in which said fin diverts air flowing along the vehicle body upwards to reduce aerodynamic lift, and a second position in which said fin guides air flow toward said rear window for blowing rain water, dust and debris off said rear window, said mounting means including means for holding said fin in the selected one of said first and second positions;
actuator means associated with said mounting means for actuating said fin between said first and second positions, said actuator means including:
a manual operator disposed with a vehicle compartment for enabling actuation of said fin between said first and second positions from inside the vehicle compartment; and
means for transmitting force applied to said manual operator to said mounting means for actuating said fin between said first and second positions, said force transmission means including a link mechanism having a first component associated with said mounting means for movement between first and second positions with said fin, and a second component releasably engaging said first component.

16. An air flow control fin for a vehicle having a rear window, comprising:
a fin;
mounting means for pivotably mounting said fin on said vehicle adjacent said rear window, said mounting means allowing pivotal movement of said fin between a first position in which said fin diverts air flowing along the vehicle body upwards to reduce aerodynamic lift, and a second position in which said fin guides air flow toward said rear window for blowing rain water, dust and debris off said rear window, said mounting means including means for holding said fin in the selected one of said first and second positions;
actuator means associated with said mounting means for actuating said fin between said first and second positions, said actuator means including:
a manual operator disposed with a vehicle compartment for enabling actuation of said fin between said first and second positions from inside the vehicle compartment;
a driving motor electrically operable in either a first or a second direction, said driving motor being electrically connected to said manual operator which comprises an electric switch actuable to either a first switch position corresponding to said first position of said fin or a second switch position corresponding to said second position of said fin; and
a link mechanism including a first component associated with said mounting means for movement between first and second positions with said fin, and a second component releasably engaging said first component.

17. An air flow control device for a vehicle having a rear window, comprising:
a fin;
mounting means for pivotably mounting said fin on a portion of the roof of said vehicle adjacent said rear window, said mounting means allowing pivotal movement of said fin between a first position in which said fin splits air flowing along the vehicle body to reduce drafting force, and a second position in which said fin guides air flow toward said rear window for sweeping rain water, dust and debris off said rear window, said mounting means including means for holding said fin in the selected one of said first and second positions; and
actuator means associated with said mounting means for actuating said fin between said first and second positions, said actuator means including:
a manual operator disposed with a vehicle compartment for enabling actuation of said fin between said first and second positions from inside the vehicle compartment; and
means for transmitting force applied to said manual operator to said mounting means for actuating said fin between said first and second positions, said force transmission means including a link mechanism having a first component associated with said mounting means for movement between first and second positions with said fin, and a second component releasably engaging said first component.

18. A air flow control device as set forth in claim 17 designed for use on a vehicle with a hatchback door incorporating said rear window, which hatchback door is pivotable about a hinge provided on a rear gate opening of the vehicle body, wherein said first component and said mounting means are mounted on said hatchback door, and said second component of said link is mounted on said vehicle body near said rear gate opening.

19. The air flow control device as set forth in claim 18 wherein said first and second components are engaged while said hatchback door is closed, and are disengaged while said hatchback door is open.

20. An air flow control fin as set forth in claim 15 designed for use on a vehicle with a hatchback door incorporating said rear window, which hatchback door is pivotable about a hinge provided on a rear gate opening of the vehicle body, wherein said first component and said mounting means are mounted on said hatchback door, and said second component of said link is mounted on said vehicle body near said rear gate opening.

21. The air flow control fin as set forth in claim 20, wherein said first and second components are engaged while said hatchback door is closed, and are disengaged while said hatchback door is open.

22. An air flow control fin as set forth in claim 16 designed for use on a vehicle with a hatchback door incorporating said rear window, which hatchback door is pivotable about a hinge provided on a rear gate opening of the vehicle body, wherein said first component and said mounting means are mounted on said hatchback door, and said second component of said link is mounted on said vehicle body near said rear gate opening.

23. The air flow control fin as set forth in claim 22, wherein said first and second components are engaged while said hatchback door is closed, and are disengaged while said hatchback door is open.

24. An air flow control device for a vehicle having a rear window, comprising:

a fin;

mounting means for pivotably mounting said fin on a portion of the roof of said vehicle adjacent said rear window, said mounting means allowing pivotal movement of said fin between a first position in which said fin splits air flowing along the vehicle body, and a second position in which said fin guides air flow toward said rear window, said mounting means including means for holding said fin in the selected one of said first and second positions, said holding means including a lever pivotable about a pivot axis and having a projection engageable with a slot in a member operatively engaging said fin, said lever being arranged to receive a force exerted on said fin and to alter the direction of said force toward said pivot axis to establish a holding force for holding said fin at said selected position; and actuator means associated with said mounting means for actuating said fin between said first and second positions, said actuator means including:
- a manual operator disposed with a vehicle compartment for enabling actuation of said fin between said first and second positions from inside the vehicle compartment; and
- a driving motor electrically operable in either a first or a second direction, said driving motor being electrically operable in either a first or a second direction, said driving motor being electrically connected to said manual operation which comprises an electric switch actuable to either a first switch position corresponding to said first position of said fin or a second switch position corresponding to said second position of said fin.

* * * * *